(12) United States Patent
Okamoto et al.

(10) Patent No.: US 10,967,905 B2
(45) Date of Patent: Apr. 6, 2021

(54) SUSPENSION SUB FRAME STRUCTURE (71) Applicant: MAZDA MOTOR CORPORATION, Hiroshima (JP)

(72) Inventors: Hiroyuki Okamoto, Bath (GB); Masaaki Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 2 days.

(21) Appl. No.: 16/566,783

(22) Filed: Sep. 10, 2019

(65) Prior Publication Data
US 2020/0086920 A1 Mar. 19, 2020

(30) Foreign Application Priority Data
Sep. 19, 2018 (JP) .............................. JP2018-175214

(51) Int. Cl.
*B62D 21/11* (2006.01)
*B60G 7/02* (2006.01)

(52) U.S. Cl.
CPC ................ *B62D 21/11* (2013.01); *B60G 7/02* (2013.01); *B60G 2204/15* (2013.01)

(58) Field of Classification Search
CPC .... B62D 21/11; B62D 27/023; B62D 21/155; B62D 25/082; B62D 21/00; B60G 2204/15; B60G 7/02
See application file for complete search history.

(56) References Cited

U.S. PATENT DOCUMENTS

| | | | |
|---|---|---|---|
| 6,435,556 B1 * | 8/2002 | Takagi | B60G 7/02 180/299 |
| 2005/0081474 A1 * | 4/2005 | Jolley | B62D 25/082 52/698 |
| 2014/0183895 A1 * | 7/2014 | Awano | B62D 29/005 296/29 |
| 2015/0083514 A1 | 3/2015 | Asano et al. | |
| 2015/0217808 A1 * | 8/2015 | Haselhorst | B62D 21/11 280/124.109 |
| 2019/0016390 A1 * | 1/2019 | Fujiwara | B62D 21/155 |
| 2019/0300059 A1 * | 10/2019 | Komiya | B62D 21/11 |

FOREIGN PATENT DOCUMENTS

| | | | | |
|---|---|---|---|---|
| JP | 2015-058856 A | | 3/2015 | |
| JP | 6237863 B1 * | 11/2017 | | B62D 21/11 |

* cited by examiner

*Primary Examiner* — Darlene P Condra
(74) *Attorney, Agent, or Firm* — Studebaker & Brackett PC (57) ABSTRACT

A suspension sub frame structure comprises a suspension sub frame provided to extend in a vehicle longitudinal direction and supporting a suspension link, an extension frame provided to extend forwardly from a front end of the suspension sub frame and having lower rigidity against a load applied in the vehicle longitudinal direction than the suspension sub frame, and a cross member provided to extend in a vehicle width direction on an inward side, in the vehicle width direction, of the both frames, wherein the cross member is joined to the both frames at a joint area which is continuous in the vehicle longitudinal direction.

4 Claims, 6 Drawing Sheets

SUSPENSION SUB FRAME STRUCTURE

BACKGROUND OF THE INVENTION

The present invention relates to a suspension sub frame structure.

A vehicle-body front structure, in which a pair of right-and-left front side frames extending in a vehicle longitudinal direction and constituting a vehicle-body front portion are provided and a suspension sub frame (hereafter, referred to as "sub frame" simply) provided below the front side frames and supporting right-and-left suspension links of a front wheel is provided, is known.

The sub frame of a vehicle-body front structure disclosed in Japanese Patent Laid-Open Publication No. 2015-58856 (US Patent Application Publication No. 2015/0083514 A1) comprises right-and-left side parts which are arranged below the front side frames and a front side part which interconnects respective front ends of the right-and-left side parts in a vehicle width direction, wherein the sub frame is configured in a U shape which is opened to a vehicle rearward side in a plan view. This sub frame is fixed to the front side frames at respective rear end portions of the right-and-left side parts. A tower member which is configured to rise from a front end portion of each of the right-and-left side parts and connected to a lower face of each of the front side frames is attached to each of the front side frames. An extension frame which extends forwardly from a middle position, in a vertical direction, of the tower member is attached to the tower member.

In the structure of the above-described patent document, an impact load inputted from a vehicle forward side is dispersed and transmitted to the front side frame through a main load path where the impact load is inputted directly to the front side frame and another load path where the impact load is inputted from the extension frame to the front side frame by way of the tower member. Thus, the impact load can be dispersed by providing the other load path where the impact load is inputted by way of the extension frame.

The above-described extension frame serves as an impact absorbing member to absorb the impact load by being deformed when receiving the impact load from the vehicle forward side. The tower member serves as a load receiving portion to receive the impact load inputted by way of the extension frame so as to make the extension frame absorb the impact load securely.

In the vehicle-body front structure of the above-described patent document, the extension frame is connected to a middle part of the tower member. Therefore, it is necessary that the tower member is formed rigidly in order that the extension frame attains its impact-load absorption sufficiently by suppressing bending deformation of the tower member when the impact load is inputted from the vehicle forward side. However, this rigidly-forming of the tower member may cause an improper increase of the vehicle weight, so that there is room for improvement in decreasing the vehicle weight.

Herein, it may be considered to create a load path which extends from the extension frame by way of the side part of the sub frame and then reaches the front side frame from the rear end portion of the side part of the sub frame. In this case, it may be considered that a rear end portion of the extension frame is directly connected to the front end portion of the side part of the sub frame which has high rigidity in the longitudinal direction. Thereby, the sub frame can serve as the load receiving portion to receive the impact load inputted to the extension frame from the vehicle forward side, thereby promoting the impact absorption performance of the extension frame.

However, in a case where the extension frame is directly connected to the sub frame as described above, it is likely that bending or breakage occur at a connection portion of the extension frame which places importance on the impact-load absorption performance and the sub frame which places importance on the rigidity in the longitudinal direction when a load in a bending direction is inputted by buckling of the extension frame.

SUMMARY OF THE INVENTION

Accordingly, an object of the present invention is to provide a suspension sub frame structure which can compatibly attain effectively performing the respective functions of the extension frame and the suspension sub frame and suppressing the bending or breakage of the connection portion of these frames, suppressing the increase of the vehicle weight.

The present invention is a suspension sub frame structure, comprising a suspension sub frame provided to extend in a vehicle longitudinal direction and supporting a suspension member of a front wheel, an extension frame provided to extend forwardly from a front end of the suspension sub frame and having lower rigidity against a load applied in the vehicle longitudinal direction than the suspension sub frame, and a cross member provided to extend in a vehicle width direction on an inward side, in the vehicle width direction, of the suspension sub frame and the extension frame, wherein the cross member is joined to the suspension sub frame and the extension frame at a joint area which is continuous in the vehicle longitudinal direction.

According to the present invention, since the extension frame having the lower rigidity than the suspension sub frame is connected to the front end of the suspension sub frame, the impact load inputted from the vehicle forward side is received by the suspension sub frame, so that the effective impact absorption can be attained by deformation of the extension frame.

Further, since the cross member extending in the vehicle width direction is joined to the suspension sub frame and the extension frame at the joint area which is continuous in the vehicle longitudinal direction, a connection portion of the both frames is reinforced by the cross member. Accordingly, even in a case where the load in the bending direction is inputted to the connection portion of the suspension sub frame and the extension frame by buckling deformation of the extension frame when the impact load is inputted from the vehicle forward side, improper bending or breakage of the connection portion can be suppressed.

In an embodiment of the present invention, the cross member comprises an upper-face joint portion which is joined to an upper face of the extension frame and an upper face of the suspension sub frame at the joint area and a lower-face joint portion which is joined to a lower face of the extension frame and a lower face of the suspension sub frame at the joint area.

According to this embodiment, the cross member is joined to the respective upper faces and the respective lower faces of the extension frame and the suspension sub frame at its upper-face joint portion and its lower-face joint portion in the joint area of the cross member such that the cross member is continuous to the both frames. That is, the cross member is joined in such a manner that it holds the upper faces and the lower faces of the both frames from a vehicle inward side. Thereby, the rigidity, in the vertical direction, of the connection portion, of the both frames, in particular, can be more increased, so that the bending or breakage of the connection portion can be effectively suppressed.

In another embodiment of the present invention, the joint area comprises a front-side joint area where the cross member is joined to the extension frame and a rear-side joint area where the cross member is joined to the suspension sub frame, and the front-side joint area is shorter than the rear-side joint area.

According to this embodiment, since the longitudinal dimension of the joint area is set such that the front-side joint area where the cross member is joined to the extension frame is relatively short compared to the rear-side joint area where the cross member is joined to the suspension sub frame, it is suppressed that the impact absorption performed by the extension frame is improperly blocked by the cross member at the front-side joint area when the impact load is inputted from the vehicle forward side.

Meanwhile, since the longitudinal dimension of the joint area is set such that the rear-side joint area where the cross member is joined to the suspension sub frame is relatively long compared to the front-side joint area where the cross member is joined to the extension frame, the rigidity of the suspension sub frame against the load in the vehicle longitudinal direction is more increased at the rear-side joint area. Thereby, when the impact load is inputted from the vehicle forward side, the impact absorption performance of the extension frame can be effectively promoted.

In another embodiment of the present invention, a bracket to make the suspension sub frame support the suspension member is attached to the extension frame and the suspension sub frame at an area which is continuous in the vehicle longitudinal direction.

According to this embodiment, since the bracket to make the suspension sub frame support the suspension member is attached to the extension frame and the suspension sub frame at the area which is continuous in the vehicle longitudinal direction, the connection portion of the both frames is reinforced more rigidly. Thereby, even in the case where the load in the bending direction is inputted to the connection portion of the suspension sub frame and the extension frame when the impact load is inputted from the vehicle forward side, the bending or breakage of the connection portion is suppressed more effectively.

Other features, aspects, and advantages of the present invention will become apparent from the following description which refers to the accompanying drawings.

DETAILED DESCRIPTION OF THE INVENTION

Hereafter, a suspension sub frame structure according to an embodiment of the present invention will be specifically described.

Figure 1:
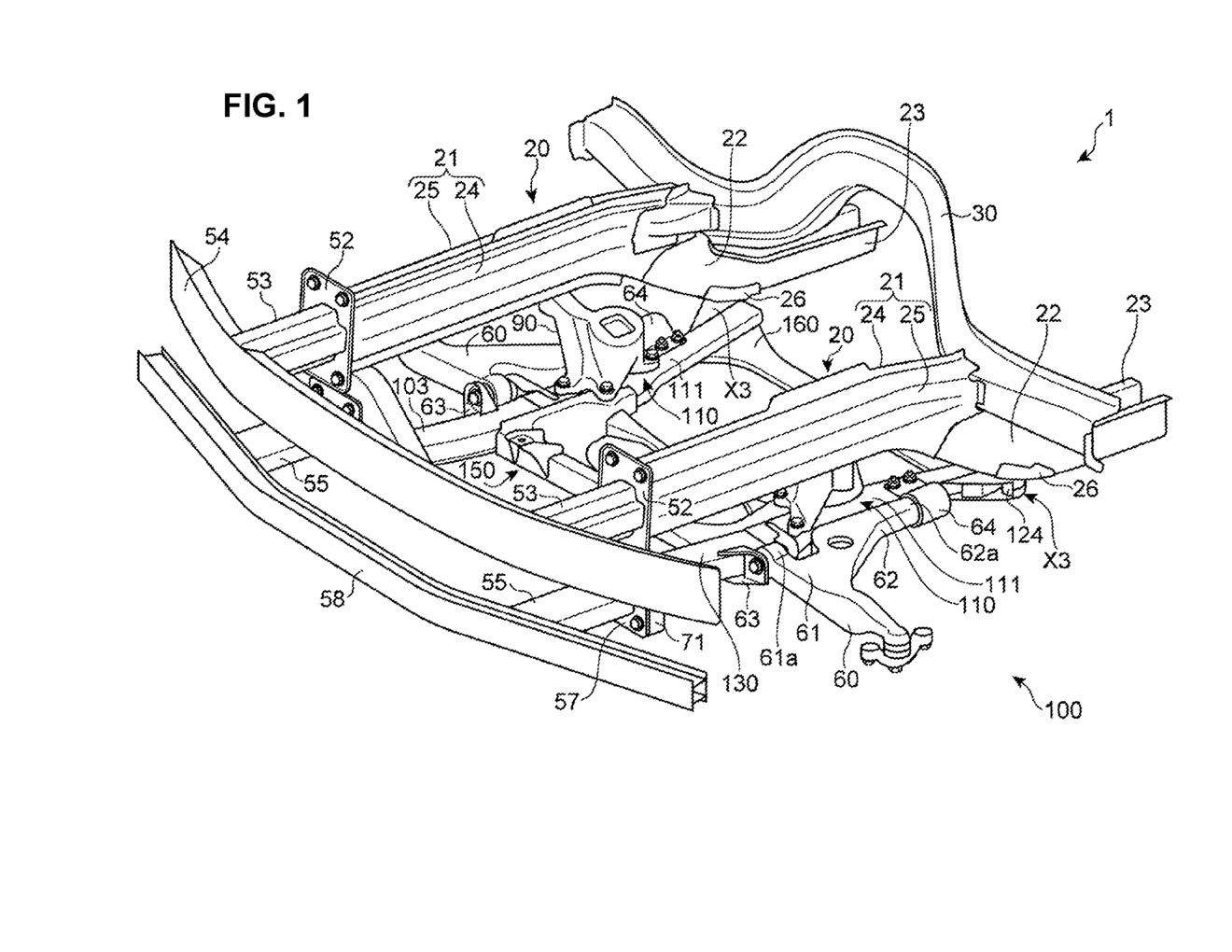
FIG. 1 is a perspective view of a vehicle-body front portion which is provided with a suspension sub frame structure according to an embodiment of the present invention.
Figure 2:
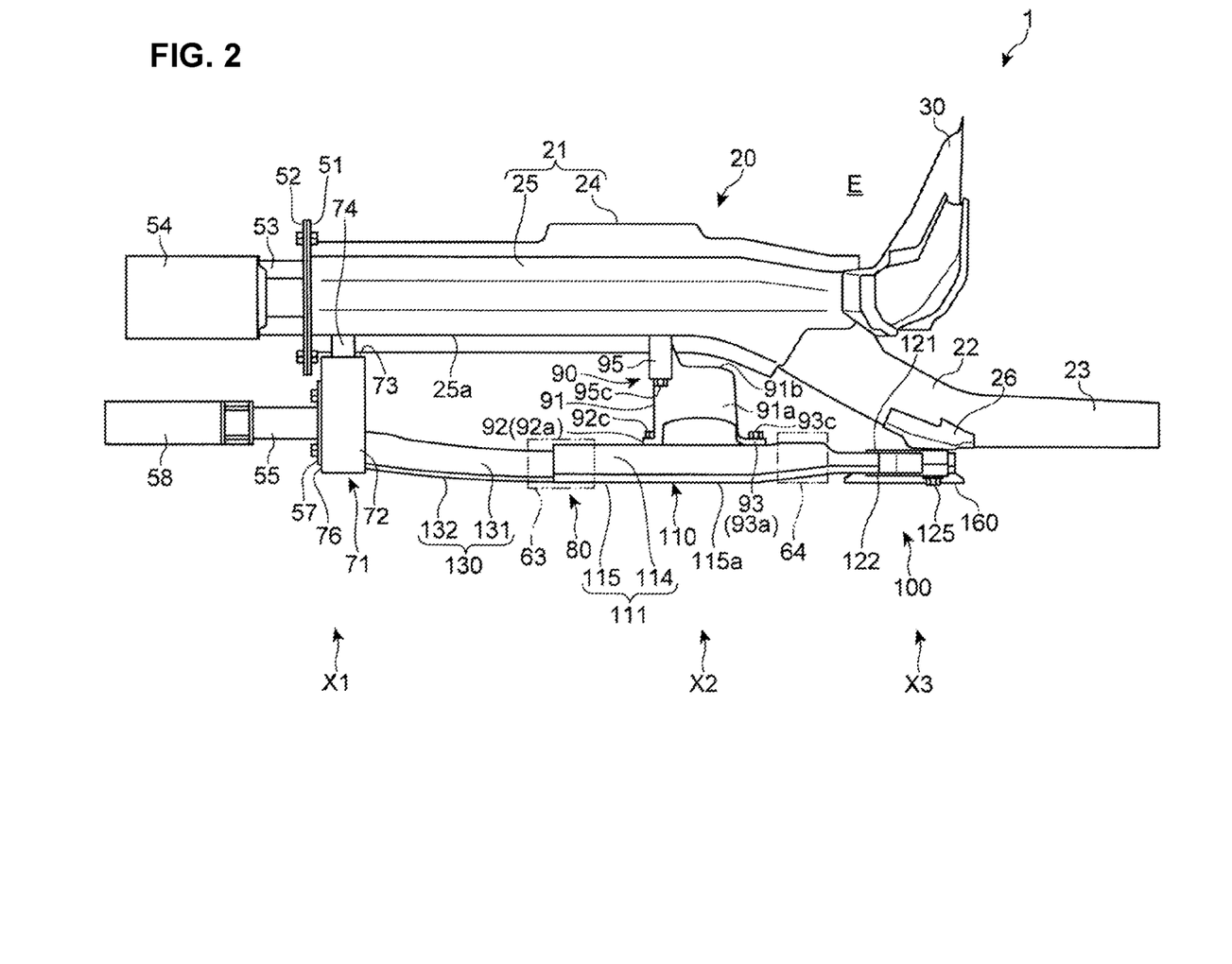
FIG. 2 is a side view of the vehicle-body front portion which is provided with the suspension sub frame structure according to the embodiment of the present invention.
Figure 3:
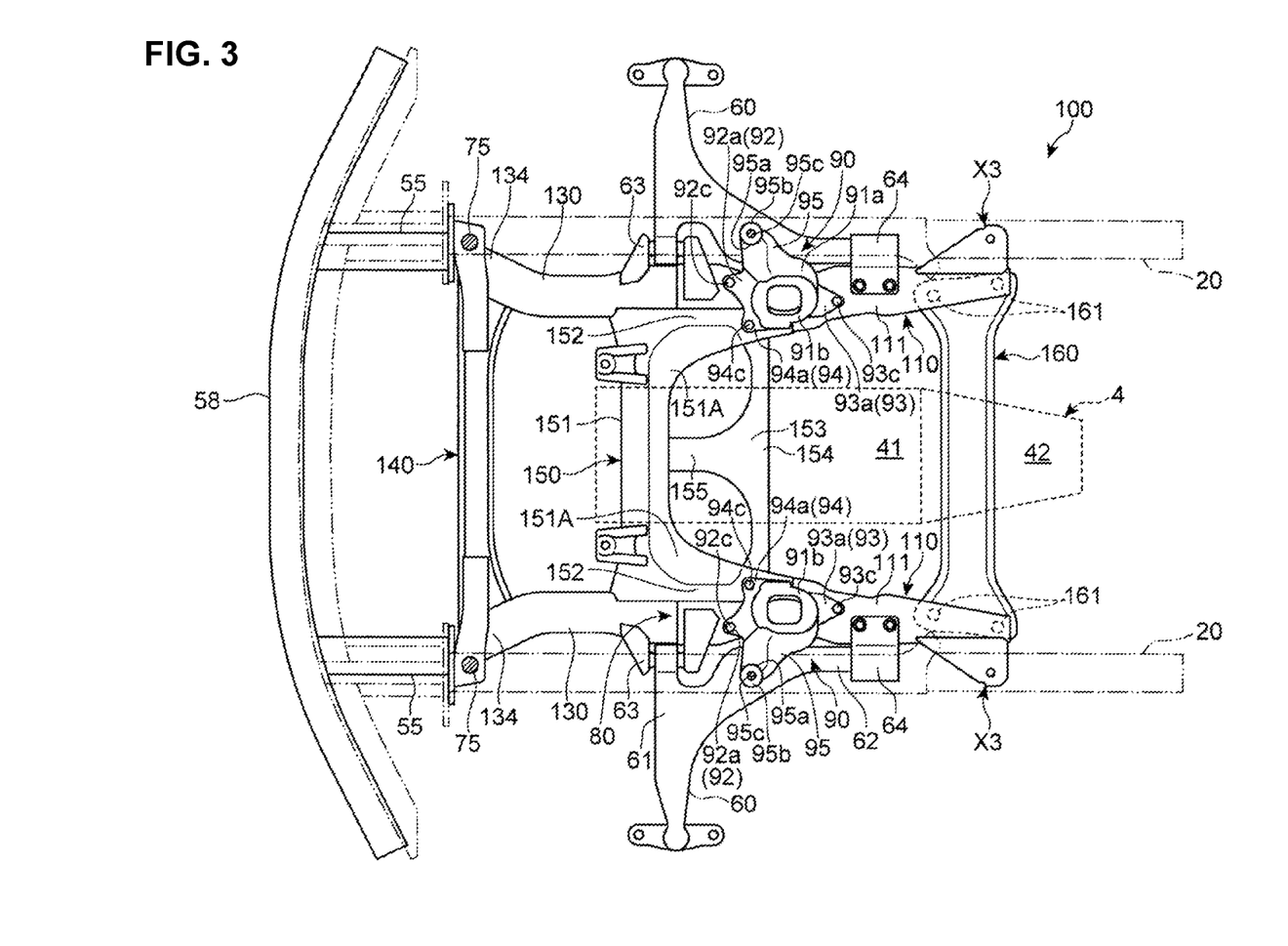
FIG. 3 is a plan view of the suspension sub frame structure according to the embodiment of the present invention.

A front vehicle-body structure 1 which is provided with a suspension sub frame structure of the present embodiment will be specifically described referring to FIGS. 1-3.

As shown in FIGS. 1 and 2, the front vehicle-body structure 1 comprises a pair of right-and-left front side frames 20, 20 which extend in the vehicle longitudinal direction, a dash cross 30 which is arranged along a front face of a dash panel (not illustrated) and interconnects the both front side frames 20, 20, and a suspension sub frame structure 100 which is arranged below the both front side frames 20, 20.

A vehicle of the present embodiment adopts a front-engine rear-drive (FR) type. A powertrain 4 which comprises a longitudinal arrangement type of engine 41 and a transmission 42 which is connected to a rear part of the engine 41 is provided in an engine room E between the front side frames 20, 20 (see FIG. 3).

Each of the front side frames 20, 20 comprises a front-side linear part 21 which extends forwardly from the dash cross 30 nearly horizontally, a slant part 22 which extends obliquely rearwardly-and-downwardly from a rear end portion of the front-side linear part 21, and a rear-side linear part 23 which extends rearwardly from a lower end portion of the slant part 22 nearly horizontally.

The front-side linear part 21 of the front side frame 20 comprises an inner panel 24 which is positioned on an inward side in the vehicle width direction and an outer panel 25 which is positioned on an outward side in the vehicle width direction, which are joined together in the vehicle width direction. The inner panel 24 is configured to have a hat-shaped cross section which is opened to the vehicle outward side, and the outer panel 25 is configured to have a hat-shaped cross section which is opened to the vehicle inward side. These panels 24, 25 extend in the vehicle longitudinal direction, respectively. The outer panel 25 and the inner panel 24 are joined together at the respective upper-and-lower edge portions. Thereby, the front-side linear part 21 is configured to have a closed cross section which is continuous in the vehicle longitudinal direction.

The slant part 22 of the front side frame 20 is configured to have a hat-shaped cross section which is opened to the vehicle upward side. The slant part 22 is arranged along a shape of the dash panel (not illustrated) such that its rearward side is located at a lower level, and an upper edge portion of the slant part 22 is joined to the dash panel. Thereby, a closed cross section which is continuous in the vehicle longitudinal direction is formed between the slant part 22 and the dash panel.

The rear-side linear part 23 of the front side frame 20 is connected to a front end portion of the floor frame (not illustrated) extending in the vehicle longitudinal direction at its rear end portion. A floor panel (not illustrated) is joined onto the rear-side linear part 23 and the floor frame, and a front end edge of the floor panel is connected to the dash panel. The rear-side linear part 23 and the floor frame are respectively configured to have a hat-shaped cross section which is opened to the vehicle upward side, and a closed cross section extending in the vehicle longitudinal direction is formed between the floor panel and each of the rear-side linear part 23 and the floor frame.

A main crash can 53 is connected to a front end of each of the front side frames 20, 20 via a set plate 51 and an attaching plate 52, wherein the main crash can 53 is made of a cylindrical member or the like which absorbs the impact load inputted from the vehicle forward side. A bumper reinforcement 54 which extends in the vehicle width direction is attached to respective front end faces of the right-and-left crash cans 53.

Next, referring to FIG. 3 in addition to FIGS. 1 and 2, the suspension sub frame structure 100 will be described. The suspension sub frame structure 100 comprises a pair of right-and-left suspension sub frames 110, 110 which are arranged below the front side frames 20, 20 and support lower arms 60, 60 as suspension links for a pair of front wheels, a pair of right-and-left extension frames 130, 130 which are joined to front ends of the suspension sub frames 110, 110 and extend forwardly, and first-third cross members 140, 150, 160 which respectively interconnect the right-and-left frames 110, 110, 130, 130.

A sub crash can 55 is configured to extent forwardly from a front end portion of each of the extension frames 130, 130. A sub bumper reinforcement 58 which extends in the vehicle width direction is provided in front of the right-and-left sub crash cans 55, 55. The right-and-left sub crash cans 55, 55 are interconnected via the sub bumper reinforcement 58.

Each of the lower arms 60, 60 supported at the suspension sub frames 110, 110 comprises a front-side arm portion 61 which extends in the vehicle width direction nearly horizontally and a rear-side arm portion 62 which extends inwardly-and-rearwardly from a middle portion, in the vehicle width direction, of the front-side arm portion 61 linearly horizontally. The lower arm 60 is configured to have a linearly L shape as a whole in a plan view.

The lower arm 60 is provided with a front-side connection portion 61a and a rear-side connection portion 62a which are positioned on the inward side, in the vehicle width direction, of the lower arm 60. The front-side connection portion 61a is connected to a relatively forward section of the suspension sub frame 110, and the rear-side connection portion 62a is connected to a relatively rearward section of the suspension sub frame 110. The front-side connection portion 61a is formed at an inward end portion, in the vehicle width direction, of the front-side arm portion 61, and the rear-side connection portion 62a is formed at a rear end portion of the rear-side arm portion 62.

The front-side connection portion 61a of the front-side arm portion 61 is pivotally supported at a front-side bracket 63 which is attached between a front end portion of the suspension sub frame 110 and a rear end portion of the extension frame 130 such that the front-side arm portion 61 rotates around an axis extending in the vehicle longitudinal direction. Meanwhile, the rear-side connection portion 62a of the rear-side arm portion 62 is pivotally supported at a rear-side bracket 64 which is attached to the suspension sub frame 110 such that the rear-side arm portion 62 rotates around an axis extending in the vehicle longitudinal direction.

Figure 4:
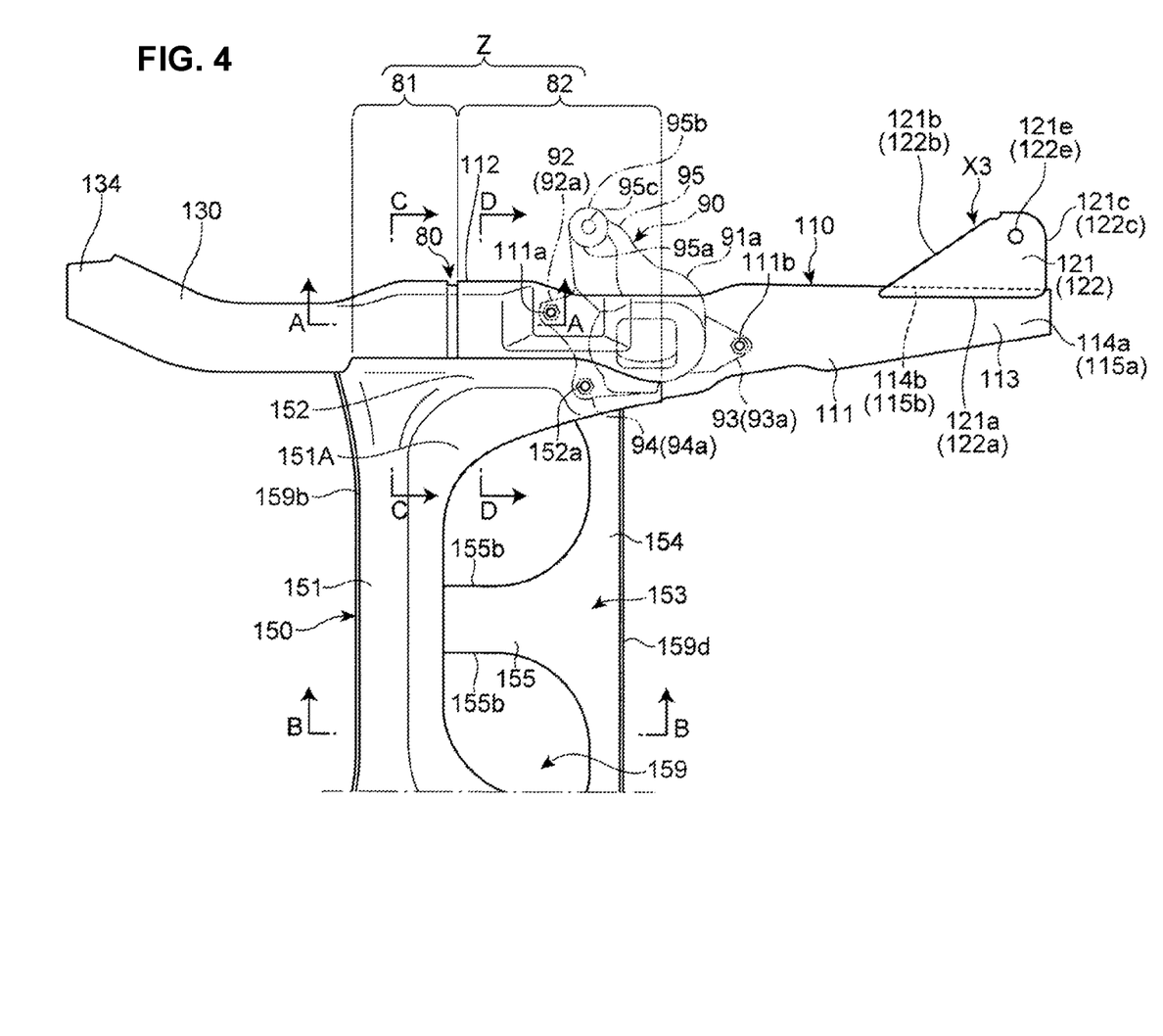
FIG. 4 is an enlarged view of a joint portion of a suspension sub frame, an extension frame, and a second cross member which are shown in FIG. 3.

As shown in FIGS. 4 and 5, the suspension sub frame 110 includes a body part 111 which supports the lower arm 60. The rear end portion of the extension frame 130 is connected to a front end portion 112 of the body part 111 of the suspension sub frame 110. Herein, a rear end portion 113 of the body part 111 is fixed to the front side frame 20 via a rear-side vehicle-body attachment portion X3 which will be described later.

The body part 111 of the suspension sub frame 110 is an elongated portion which is configured to extend in the vehicle longitudinal direction. The body part 111 comprises an upper member 114 which is configured to have a U-shaped cross section which is opened to the vehicle downward side and a lower member 115 which is configured to have a U-shaped cross section which is opened to the vehicle upward side. A lower edge portion of the upper member 114 and an upper edge portion of the lower member 115 are joined together by welding, for example. The body part 111 is configured to have a closed cross section which is formed between the upper member 114 and the lower member 115.

Specifically, the upper member 114 comprises an upper face portion 114a, an outward-side face portion 114b, and an inward-side face portion 114c, and the lower member 115 comprises a lower face portion 115a, an outward-side face portion 115b, and an inward-side face portion 115c. The outward-side face portions 114b, 115b and the inward-side face portions 114c, 115c of the upper member 114 and the lower member 115 are joined, respectively, thereby forming the closed cross section extending in the vehicle longitudinal direction (see FIG. 5D).

An opening portion 116 (see FIG. 5A) is formed by the upper member 114 and the lower member 115 at the front end portion 112 of the body part 111 of the suspension sub frame 110.

Figure 5A:
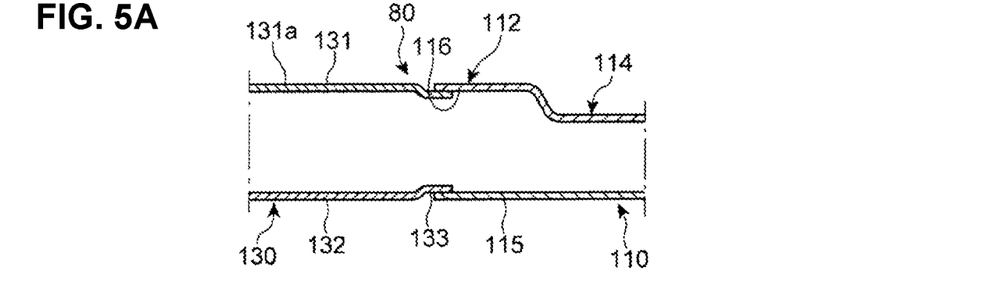
FIGS. 5A, 5B, 5C and 5D are respective sectional views taken along lines A-A, B-B, C-C and D-D of FIG. 4.
Figure 5B:
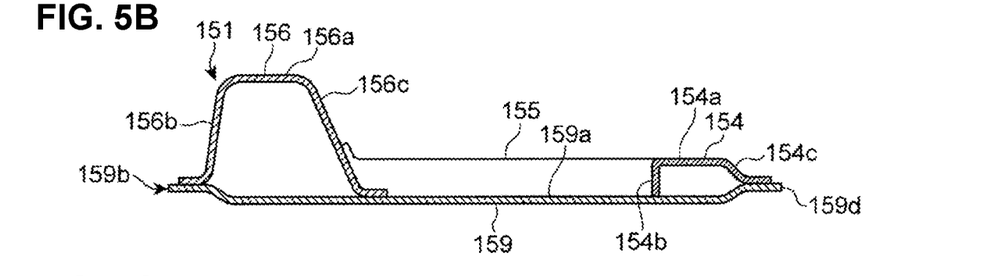
Figure 5C:
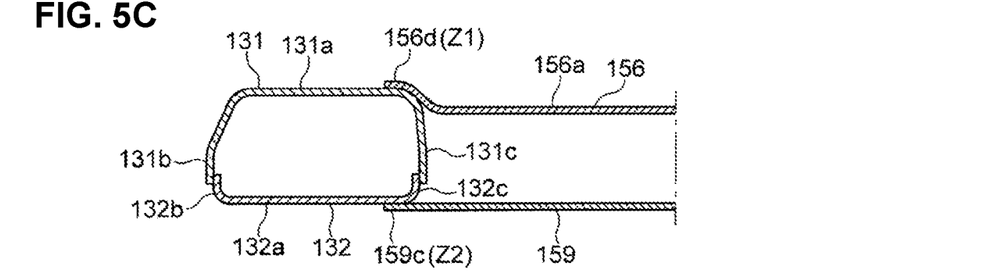

As shown in FIGS. 5A and 5C, the extension frame 130 is, similarly to the body part 111 of the suspension sub frame 110, configured to have a closed cross section extending in the vehicle longitudinal direction, which is formed by an upper member 131 which is configured to have a U-shaped cross section which is opened to the vehicle downward side and a lower member 132 which is configured to have a U-shaped cross section which is opened to the vehicle upward side.

Specifically, the upper member 131 comprises an upper face portion 131a, an outward-side face portion 131b, and an inward-side face portion 131c, and the lower member 132 comprises a lower face portion 132a, an outward-side face portion 132b, and an inward-side face portion 132c. The outward-side face portions 131b, 132b and the inward-side face portions 131c, 132c of the upper member 131 and the lower member 132 are joined, respectively, thereby forming the closed cross section extending in the vehicle longitudinal direction (see FIG. 5C).

Herein, the rear end portion 133 of the extension frame 130 is configured to have a smaller outer diameter than a part of the extension frame 130 which is positioned on the forward side of the rear end portion 133.

The both frames 110, 130 are connected to each other by inserting the rear end portion 133 of the extension frame 130 into the opening portion 116 of the front end portion 112 of the body part 111 of the suspension sub frame 110 (see FIG. 5A). The both frames 110, 130 are joined by welding or the like, for example, at a connection portion 80 of these frames 110, 130. Thereby, the extension frame 130 and the suspension sub frame 110 are integrally continuous in the vehicle longitudinal direction (see FIG. 5A).

In the present embodiment, the rigidity of the extension frame 130 against the inputted load in the vehicle longitudinal direction is set to be lower than that of the suspension sub frame 110. Thereby, the extension frame 130 and the suspension sub frame 110 which are continuous in the vehicle longitudinal direction can perform different functions. Specifically, the suspension sub frame 110 which is positioned on the rearward side and has the relatively high rigidity can serve as a load receiving portion, whereas the extension frame 130 which is positioned on the forward side and has the relatively low rigidity can perform the load absorption function.

Next, the first-third cross members 140, 150, 160 which are provided between the right-and-left suspension sub frames 110, 110 and the right-and-left extension frames 130, 130 of the suspension sub frame structure 100 will be described referring to FIG. 3.

The frame-shaped roughly-linear first cross member 140 is attached to the front end portions 134, 134 of the pair of right-and-left extension frames 130, 130 so as to interconnect (bridge) the front end portions 134, 134 in the vehicle width direction.

The connection portion 80 of the right-side suspension sub frame 110 and the right-side extension frame 130 and another connection portion of the left-side suspension sub frame 110 and the left-side extension frame 130 are interconnected via the second cross member 150.

The second cross member 150 comprises a front side portion 151 which extends in the vehicle width direction between the right-and-left extension frames 130, 130 and interconnects these extension frames 130, 130, right-and-left side portions 152, 152 which extend rearwardly from right-and-left both end portions of the front side portion 151, and a reinforcing frame 153 which is arranged between the right-and-left side portions 152, 152. The reinforcing frame 153 comprises a lateral frame portion 154 which extends in the vehicle width direction between the right-and-left side portions 152, 152 and interconnects respective rear end portions of these side portions 152, 152 and a longitudinal frame portion 155 which extends in the vehicle longitudinal direction between the lateral frame portion 154 and the front side portion 151 and interconnects these portions 154, 151.

As shown in FIG. 5B, the front side portion 151 comprises an upper member 156 which is configured to extend in the vehicle width direction and have a U-shaped cross section which is opened to the vehicle downward side and a plate-shaped lower member 159 which is configured to close an opening face of the upper member 156. The lower member 159 is configured to have a wider width, in the vehicle longitudinal direction, than the upper member 156 and protrude rearward beyond the upper member 156. Further, the lower member 159 is arranged over an area, in the vehicle longitudinal direction, between the extension frame 130 and the suspension sub frame 110.

The upper member 156 of the front side portion 151 comprises an upper face portion 156a, a front face portion 156b, and a rear face portion 156c. The upper member 156 is provided at an upper face 159a of the lower member 159, and the front face portion 156b is provided along a front end portion 159b of the lower member 159. Respective lower end portions of the front face portion 156b and the rear face portion 156c are joined to the upper face 159a of the lower member 159, so that a closed cross section extending in the vehicle width direction is formed between the upper member 156 and the lower member 159.

As shown in FIG. 5C, the upper face portion 156a of the front-side upper member 156 is joined to the respective upper face portions 131a, 131a of the extension frames 130, 130 at both edge portions 156d, 156d, in the vehicle width direction, of the upper face portion 156a.

Figure 5D:
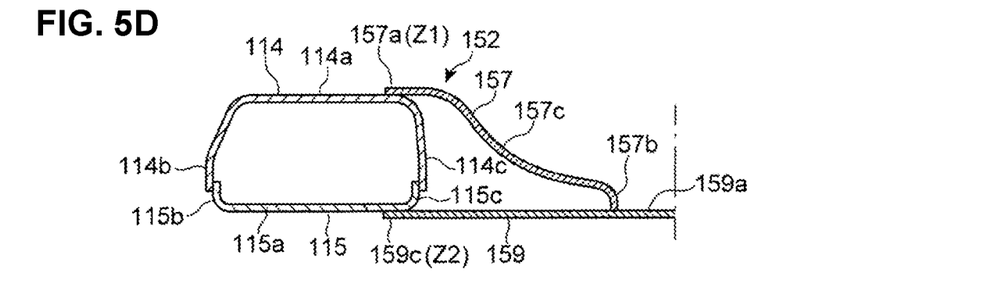

As shown in FIGS. 5C and 5D, both end portions 159c, 159c, in the vehicle width direction, of the lower member 159 are joined to the lower face portions 132a, 132a of the extension frames 130, 130 and the lower face portions 115a, 115a of the body parts 111, 111 of the suspension sub frames 110, 110.

As shown in FIG. 5D, the right-and-left side portions 152, 152 comprise upper members 157, 157 which are integrally continuous to the above-described front-side-portion upper member 156 and the above-described lower member 159. This upper member 157 is provided to extend in the vehicle longitudinal direction and be continuous to the front-side-portion upper member 156 at its front end portion. Thereby, the front-side-portion upper member 156 and the upper members 157, 157 of the right-and-left side portions 152, 152 are configured to have a U-shaped cross section which is opened to the vehicle rearward side as a whole in the plan view (see FIG. 3).

The upper member 157 of the side portion 152 is configured such that its inner edge portion 157b is located at a lower level than its outer edge portion 157a. Further, this upper member 157 comprises a slant portion 157c which is configured to gradually lower as it goes from the outer edge portion 157a to the inner edge portion 157b.

The inner edge portions 157b, 157b of the above-described upper members 157, 157 are joined to the upper face 159a of the lower member 159, and the outer edge portions 157a, 157a are joined to the upper face portions 114a, 114a of the body parts 111, 111 of the suspension sub frames 110, 110.

Thereby, a closed cross section extending in the vehicle longitudinal direction is formed by the upper member 157, the lower member 159, and the inward-side face portions 114c, 115c of the body part 111 of the suspension sub frame 110.

As shown in FIG. 3, each of the right-and-left side portions 152, 152 of the second cross member 150 is configured such its width is gradually enlarged toward the vehicle forward side in the plan view. Thereby, a reinforcing portion 151A having an arc-shaped contour is formed at each corner portion between the front side portion 151 and the right-and-left side portions 152, 152. Thereby, the rigidity of the lower arm 60 of the suspension device against a lateral force is increased, so that the suspension sub frame 110 and the extension frame 130 are suppressed from being deformed inwardly in the vehicle width direction.

As described above, the second cross member 150 comprises the nearly T-shaped reinforcing frame 153 which is formed by the lateral frame portion 154 interconnecting the respective rear end portions of the right-and-left side portions 152, 152 and the longitudinal frame portion 155 interconnecting the middle portion of the lateral frame portion 154 and the middle portion of the front side portion 151.

As shown in FIG. 5B, the lateral frame portion 154 is configured to have a U-shaped cross section which extends in the vehicle width direction and is opened to the vehicle downward side. Meanwhile, the longitudinal frame portion 155 is configured to have a U-shaped cross section which extends in the vehicle longitudinal direction and is opened to the vehicle downward side.

The lateral frame portion 154 comprises an upper face portion 154a, a front face portion 154b, and a rear face portion 154c, wherein the rear face portion 154c is positioned along the rear end portion 159d of the lower member 159. The front face portion 154b and the rear face portion 154c of the lateral frame portion 154 are joined to the upper face 159a of the lower member 159. Thereby, a closed cross section which is continuous in the vehicle width direction is formed between the lateral frame portion 154 and the lower member 159. Herein, both side portions 154d, 154e of the lateral frame portion 154 are respectively joined to the slant portions 157c, 157c of the right-and-left side portions 152, 152 (see FIGS. 3 and 4).

The longitudinal frame portion 155 comprises an upper face portion 155a and both side face portions 155b, 155b in the vehicle width direction, and respective lower end portions of the both side face portions 155b, 155b are joined to the lower member 159. Thereby, a closed cross section extending in the vehicle longitudinal direction is formed between the longitudinal frame portion 155 and the lower member 159. Herein, a front end portion 155c of the longitudinal frame portion 155 is joined to the rear face portion 156c of the front side portion 151.

Herein, a joint area Z of the second cross member 150 and the suspension sub frame 110 and the extension frame 130 will be described later.

As shown in FIG. 3, there is provided the third cross member 160 which interconnects the respective rear end portions 113, 113 of the suspension sub frames 110, 110 in the vehicle width direction. The third cross member 160 is a plate member extending in the vehicle width direction which is fixed to the rear end portions 113, 113 of the suspension sub frames 110, 110 from below with plural bolts 161 . . . 161 or the like.

Further, as shown in FIG. 2, the above-described sub frame structure 100 is provided with three sets of attachment portions to the frontside frames 20, 20, i.e., front-side vehicle-body attachment portions X1, X1, middle vehicle-body attachment portions X2, X2, and the rear-side vehicle-body attachment portions X3, X3, at its right-and-left both sides. Hereafter, these will be specifically described.

The front-side vehicle-body attachment portion X1 is formed by a connecting member 71 which is provided at the front end portion 134 of the extension frame 130. Specifically, the connecting member 71 is configured in a tower shape such that its lower part 72 is connected to the extension frame 130 and the other part extends upwardly.

Further, the connecting member 71 is of a hollow boxy shape, and an upper face portion 73 of an outward-side portion, in the vehicle width direction, thereof is attached to a lower face 25a of the outer panel 25 of the front side frame 20 via a mount bush 74 by using a fastening member 75.

Herein, the sub crash can 55 is connected to a vertical-wall shaped front face 76 of the connecting member 71 via an attaching plate 57.

The middle vehicle-body attachment portion X2 is formed by a powertrain mount bracket (hereafter, referred to as "mount bracket" simply) 90. An engine mount (not illustrated) for resiliently supporting the powertrain 4 (see FIG. 3) is stored at the mount bracket 90. The mount bracket 90 is fixed to the body part 111 of the suspension sub frame 110. In the present embodiment, the mount bracket 90 is integrally made of diecast, such as aluminum diecast. However, a material of the mount bracket 90 should not be limited to aluminum.

A hollow-shaped storage portion 91 with a storage space which is opened to the vehicle upward side is formed at the mount bracket 90. This storage portion 91 is of a cylindrical shape, for example. A mount support structure which is connected to a powertrain-side bracket provided at the powertrain 4 is stored in the storage portion 91.

The mount bracket 90 is provided with plural fastening portions 92, 93, 94 for fastening to the suspension sub frame structure 100. The plural fastening portions 92, 93, 94 comprise a front-side fastening portion 92 which is provided at a front edge portion of the mount bracket 90, a rear-side fastening portion 93 which is provided at a rear end portion of the mount bracket 90, and a middle fastening portion 94 which is provided between the front-side fastening portion 92 and the rear-side fastening portion 93.

Specifically, the fastening portions 92, 93, 94 are formed by plural flange portions 92a, 93a, 94a which are configured to extend outwardly from a lower end portion of an outer peripheral portion 91a of the storage portion 91 of the mount bracket 90. These flange portions 92a, 93a, 94a have bolt insertion holes (not illustrated), through which bolts are inserted, whereby the flange portions 92a, 93a, 94a are fastened to the suspension sub frame structure 100.

Meanwhile, the suspension sub frame 110 is provided with bolt fastening holes 111a, 111b for attaching the mount bracket 90 which are located at positions which correspond to the above-described bolt insertion holes of the front-side fastening portion 92 and the rear-side fastening portion 93 of the mount bracket 90, respectively (see FIG. 4).

Each of the right-and-left side portions 152, 152 of the second cross member 150 is provided with a bolt fastening hole 152a for attaching the mount bracket 90 which is located at a position which corresponds to the bolt insertion hole of the middle fastening portion 94. Herein, the middle fastening portion 94 is fastened to the vicinity of a rear end portion of the side portion 152 nearly at the same position, in the vehicle longitudinal direction, as the lateral frame portion 154. Thereby, it is suppressed that the mount bracket 90 is displaced in such a manner that it falls down inwardly (so-called inward falling down).

Bolts 92c, 93c, 94c which are inserted into the bolt insertion holes of the mount bracket 90 and the bolt insertion holes 111a, 111b, 152a of the suspension sub frame 110 and the side portion 152 are screwed into weld nuts, not illustrated, which are provided at the lower faces 115a, 159 of the suspension sub frame 110 and the side portion 152. Thereby, the mount bracket 90 is fastened to the suspension sub frame 110.

The mount bracket 90 is provided with a protrusion portion 95 which extends outwardly-and-upwardly from an outer edge, in the vehicle width direction, of an upper wall face portion 91b of the storage portion 91. A pole-shaped portion 95b which protrudes upwardly is provided at an outward end portion 95a, in the vehicle width direction, of the protrusion portion 95. The pole-shaped portion 95b is attached to the lower face 25a of the outer panel 25 with a bolt 95c at a rear portion of the front-side liner part 21 of the front side frame 20, whereby the middle vehicle-body attachment portion X2 is formed. Herein, the middle vehicle-body attachment portion X2 is rigidly joined to the front side frame 20 via no damping element, such as a rubber bush.

The rear-side vehicle-body attachment portion X3 is, as shown in FIGS. 2 and 3, provided beside the rear end portion 113 of the body part 111 of the suspension sub frame 110. The rear-side vehicle-body attachment portion X3 comprises an upper-side plate member 121 and a lower-side plate member 122.

The upper-side plate member 121 and the lower-side plate member 122 respectively comprise, as shown in FIG. 4, side edge portions 121a, 122a which extend in parallel to the outward-side faces 114b, 115b of the suspension sub frame 110, front edge portions 121b, 122b which extend obliquely rearwardly-and-outwardly, and rear edge portions 121c, 122c which connect the side edge portions 121a, 122a and rear end portions of the front edge portions 121*b*, 122*b*, which are of a nearly triangular shape as a whole in the plan view.

The upper-side plate member 121 and the lower-side plate member 122 are joined together by welding respective flange portions (not illustrated) provided at their rear edge portions 121*c*, 122*c*.

The side edge portion 121*a* of the upper-side plate member 121 is joined to the rear portion of the body part 111 of the suspension sub frame 110 by welding, for example, and the side edge portion 122*a* of the lower-side plate member 122 is joined to the lower face 115*a* of the rear portion of the body part 111 of the suspension sub frame 110. Thereby, the rear-side vehicle-body attachment portion X3 is joined to the body part 111 of the suspension sub frame 110.

The upper-side plate member 121 and the lower-side plate member 122 of the rear-side vehicle-body attachment portion X3 are provided with bolt insertion holes 121*e*, 122*e* for fastening the suspension sub frame 110 to the front side frame 20 at a position which is outwardly, in the vehicle width direction, spaced apart from the body part 111 of the suspension sub frame 110.

A sleeve member 124 (see FIG. 1) to be fixed to the front side frame 20 with a bolt 125 is interposed between the upper-side plate member 121 and the lower-side plate member 122. This sleeve member 124 is connected to the body part 111 via the upper-side plate member 121 and the lower-side plate member 122.

Meanwhile, a bracket 26 for fixing the rear-side vehicle-body attachment portion X3 is joined to the rear end portion of the slant part 22 of the front side frame 20 from below. A weld nut (not illustrated) into which the bolt 125 is screwed is attached to an upper face of the bracket 26.

At the rear-side vehicle-body attachment portion X3, a tip portion of the bolt 125 which is inserted from below into the bolt insertion hole 122*e* of the lower-side plate member 122, a hole (not illustrated) of the sleeve member 124, and the bolt insertion hole 121*e* of the upper-side plate member 121 is screwed into the above-described weld nut of the bracket 26. Thereby, the suspension sub frame 110 is fixedly fastened to the lower face of the front side frame 20 at the rear-side vehicle-body attachment portion X3.

Next, a move (operation) of the suspension sub frame structure 100 according to the present embodiment when the impact load is inputted from a vehicle forward side will be described.

The impact load inputted to the bumper reinforcement 54 from the vehicle forward side is transmitted to the vehicle rearward side by way of the main crash cans 53, 53 and the front side frames 20, 20. The impact load inputted to the sub bumper reinforcement 58 from the vehicle forward side is transmitted to the front side frames 20, 20 by way of the sub crash cans 55, 55, the extension frames 130, 130, the body parts 111, 111 of the suspension sub frame 110, 110, and the rear-side attachment portions X3, X3. Thus, the impact load transmission route toward the vehicle rearward side can be dispersed into two load paths.

Further, when the relatively-large impact load is inputted to the bumper reinforcement 54 and the sub bumper reinforcement 58 from the vehicle forward side, the main crash cans 53, 53 and the sub crash cans 55, 55 are crushed, thereby attaining the impact absorption. Part of the impact load which has not been absorbed through crushing of the crash cans 53, 53, 55, 55 is inputted to the respective front end portions of the front side frames 20, 20 and the extension frames 130, 130, and then transmitted toward the vehicle rearward side through the above-described two load paths.

When the larger impact load is inputted from the vehicle forward side, the impact load is absorbed by deformation of the front side frames 20, 20 and the extension frames 130, 130. Herein, since the suspension sub frames 110, 110 effectively serve as the load receiving portions because of the above-described structure with the closed cross section, the impact absorption performance of the extension frames 130, 130 is properly increased.

Hereafter, the joint area Z of the second cross member 150 and the extension frame 130 and the suspension sub frame 110 will be described specifically referring to FIG. 4 primarily.

As shown in FIG. 4, the outward-side end portion of the second cross member 150 is joined to the extension frame 130 and the suspension sub frame 110 over the longitudinally-continuous joint area Z.

More specifically, as described above, the outer edge portion 156*d* of the front-side-portion upper member 156 and the outer edge portion 157*a* of the side-portion upper member 157 of the second cross member 150 are respectively joined to the upper face portion 131*a* of the rear end portion 133 of the extension frame 130 and the upper face portion 114*a* of the front end portion 112 of the suspension sub frame 110 as an upper-face joint portion Z1 (see FIGS. 5C and 5D).

Further, the both end portions 159*c*, 159*c* of the lower member 159 of the second cross member 150 are respectively joined to the lower face portion 132*a* of the rear end portion 133 of the extension frame 130 and the lower face portion 115*a* of the front end portion 112 of the suspension sub frame 110 as a lower-face joint portion Z2 (see FIGS. 5C and 5D).

Thereby, the second cross member 150 is joined to the both frames 110, 130 in such a manner that it holds the connection portion 80 of the extension frame 130 and the suspension sub frame 110 from the vehicle inward side at the longitudinally-continuous joint area Z. Accordingly, it is suppressed that the connection portion 80 of the both frames 110, 130 which have different functions is bent or broken in the vertical direction or inwardly in the vehicle width direction, in particular, when the impact load is inputted from the vehicle forward side.

The joint area Z comprises an extension-frame-side joint area 81 as a front-side joint area for the extension frame 130 and a suspension-sub-frame-side joint area 82 as a rear-side joint area for the suspension sub frame 110. The extension-frame-side joint area 81 is shorter than the suspension-sub-frame-side joint area 82 in the vehicle longitudinal direction.

Since it is avoided that the extension-frame-side joint area 81 is improperly long as described above, it is suppressed that appropriate deformation of the extension frame 130 is blocked by the second cross member 150 when the impact load is inputted from the vehicle forward side. Accordingly, the impact absorption function of the extension frame 130 can be properly performed.

Meanwhile, since the suspension-sub-frame-side joint area 82 is set to be relatively long, the rigidity and strength of the suspension sub frame 110 against the load in the vehicle longitudinal direction is properly improved. Accordingly, the suspension sub frame 110 can properly perform the function as the load receiving portion, so that the extension frame 130 can properly perform the impact absorption function.

Figure 6:
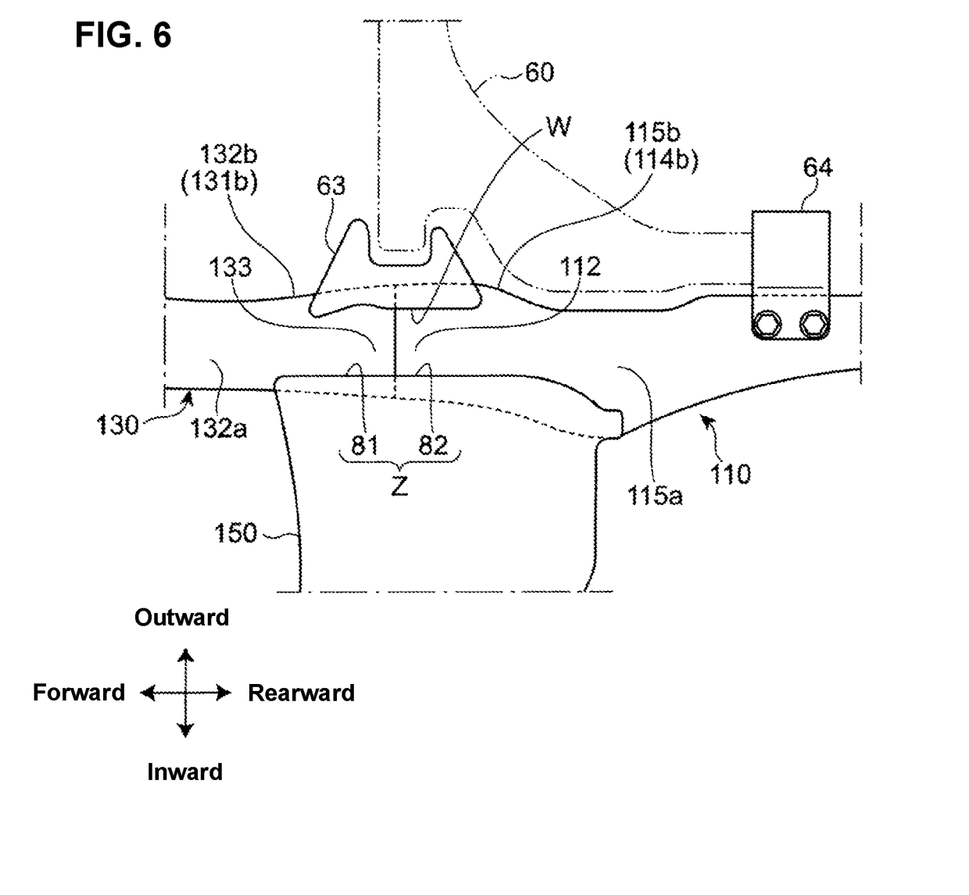
FIG. 6 is an enlarged bottom view of a major part of the joint portion of the suspension sub frame, the extension frame, the second cross member, and a front-side bracket.

As shown in the bottom view of FIG. 6, the above-described front-side bracket 63 to support the lower arm 60 is attached to the connection portion 80 of the extension frame 130 and the suspension sub frame 110 from the vehicle outward side. The front-side bracket 63 is joined to a range over the lower face portion 132a of the extension frame 130 and the lower face portion 115a of the suspension sub frame 110 at an area W which is continuous in the vehicle longitudinal direction.

Thereby, the connection portion 80 of the extension frame 130 and the suspension sub frame 110 is reinforced by the side portion 152 of the second cross member 150 particularly at its inward side, and reinforced by the front-side bracket 63 at its outward side. Consequently, bending deformation of the connection portion 80 of the both frames 110, 130 can be suppressed more effectively.

Further, since the front-side bracket 63 is used for reinforcing the outward side of the connection portion 80, the reinforcement is attained without adding any special reinforcing member.

As described, since the suspension sub frame structure of the present invention can compatibly attain effectively performing the respective functions of the extension frame and the suspension sub frame and suppressing the bending or breakage of the connection portion of these frames, suppressing the increase of the vehicle weight, the present suspension sub frame structure is properly usable in a vehicle-body manufacturing industrial field of the vehicle.

What is claimed is:

1. A suspension sub frame structure, comprising:
   a suspension sub frame provided to extend in a vehicle longitudinal direction and supporting a suspension member of a front wheel;
   an extension frame provided to extend forwardly from a front end of the suspension sub frame and having lower rigidity against a load applied in the vehicle longitudinal direction than the suspension sub frame; and
   a cross member provided to extend in a vehicle width direction on an inward side, in the vehicle width direction, of the suspension sub frame and the extension frame,
   wherein said cross member is joined to said suspension sub frame and said extension frame at a joint area which is continuous in the vehicle longitudinal direction; and
   wherein said joint area comprises a front-side joint area where said cross member is joined to said extension frame and a rear-side joint area where said cross member is joined to said suspension sub frame, and said front-side joint area is shorter than said rear-side joint area.

2. The suspension sub frame structure of claim 1, wherein said cross member comprises an upper-face joint portion which is joined to an upper face of said extension frame and an upper face of said suspension sub frame at said joint area and a lower-face joint portion which is joined to a lower face of said extension frame and a lower face of said suspension sub frame at said joint area.

3. The suspension sub frame structure of claim 2, wherein a bracket to make said suspension sub frame support said suspension member is attached to said extension frame and said suspension sub frame at an area which is continuous in the vehicle longitudinal direction.

4. The suspension sub frame structure of claim 1, wherein a bracket to make said suspension sub frame support said suspension member is attached to said extension frame and said suspension sub frame at an area which is continuous in the vehicle longitudinal direction.

* * * * *